(12) United States Patent
Tomitaka

(10) Patent No.: US 9,724,970 B2
(45) Date of Patent: Aug. 8, 2017

(54) PNEUMATIC TIRE

(71) Applicant: TOYO TIRE & RUBBER CO., LTD., Osaka-shi, Osaka (JP)

(72) Inventor: Yu Tomitaka, Osaka (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 305 days.

(21) Appl. No.: 14/520,720

(22) Filed: Oct. 22, 2014

(65) Prior Publication Data

US 2015/0151591 A1    Jun. 4, 2015

(30) Foreign Application Priority Data

Nov. 29, 2013    (JP) .................................. 2013-247859

(51) Int. Cl.
*B60C 5/14*        (2006.01)
*B60C 15/00*       (2006.01)
*B60C 9/02*        (2006.01)

(52) U.S. Cl.
CPC ...... *B60C 15/0009* (2013.01); *B60C 15/0072* (2013.04); *B60C 2015/009* (2013.04)

(58) Field of Classification Search
CPC  B60C 1/0008; B60C 5/12; B60C 5/14; B60C 5/142; B60C 9/00; B60C 9/02; B60C 15/00; B60C 15/0072
See application file for complete search history.

(56) References Cited

U.S. PATENT DOCUMENTS 5,513,686 A * 5/1996 Diernaz .............. B60C 15/0072
152/454

FOREIGN PATENT DOCUMENTS

| CH | 407782 | * | 2/1966 |
| DE | 3515944 | * | 11/1986 |
| JP | 7-315013 A | | 12/1995 |
| JP | 2005-289301 A | | 10/2005 |
| JP | 2007-131173 A | | 5/2007 |
| WO | 98/52777 A1 | | 11/1998 |

OTHER PUBLICATIONS

Machine translation of CH 407782, 1966.*
Machine translation of DE 3515944, 1986.*
Office Action dated May 9, 2017, issued in counterpart Japanese Patent Application No. 2013-247859, with English translation. (7 pages).

* cited by examiner

*Primary Examiner* — Justin Fischer
(74) *Attorney, Agent, or Firm* — Westerman, Hattori, Daniels & Adrian, LLP

(57) ABSTRACT

There is provided an pneumatic tire including a pair of left and right beads each including a bead core and a bead filler, and a carcass ply extending between the pair of beads, wherein the carcass ply is wound up around the bead core from the outside to the inside in the widthwise direction of the tire, and an end portion of the wind-up portion of the carcass ply is provided with notches at a plurality of positions in the circumference direction of the tire.

5 Claims, 4 Drawing Sheets

PNEUMATIC TIRE

CROSS-REFERENCE TO RELATED APPLICATIONS

This application is based upon and claims the benefit of priority from the prior Japanese Patent Application No. 2013-247859, filed on Nov. 29, 2013; the entire contents of which are incorporated herein by reference.

BACKGROUND

1. Technical Field

The present invention relates to a pneumatic tire.

2. Related Art

A pneumatic tire includes a carcass ply embedded as a reinforcing material. The carcass ply is generally configured to be wound up from inside to outside in a widthwise direction of a tire (hereinafter, referred to simply as "widthwise direction") so as to wrap around a bead core with an end portion thereof. In contrast, JP-A-2007-131173, WO98/52777, and JP-A-7-315013 propose a configuration in which a carcass ply is wound up from the outside to the inside in the widthwise direction. By winding up the carcass ply from the outside to the inside in the widthwise direction, a distribution of a tensile force applied to the carcass ply is changed so as to increase a tensile force at a position which easily contributes to tire rigidity, and a steering stability performance of a tire is improved.

Specifically, JP-A-2007-131173 discloses a configuration in which steeering stability of a tire is improved by winding around the bead core with a single layer carcass ply from the outside to the inside in the widthwise direction so as to arrange an end portion of the carcass ply on the inside of the bead core in the radial direction of the tire (hereinafter, referred to simply as "radial direction").

WO98/52777 discloses a tire intended to substantially reduce the frequency of occurrence of tire breakage in an early stage with a carcass ply wound up around bead cores from the outside to inside in the widthwise direction.

JP-A-07-315013 discloses an pneumatic radial tire capable of contributing to the weight reduction of the tire and maintenance of tire rigidity without lowering performances such as a steering stability by having a configuration that a carcass ply passes through outer surface sides of the tire with respect to bead fillers, and both end portions of the carcass ply are wound up around the bead cores on both sides from the outside toward the inside so as to be supported thereby.

The configuration in which the carcass ply is wound up from the outside to the inside in the widthwise direction in a manner as described above is advantageous in terms of the steering stability. However, the end portions of the carcass ply being wound get wrinkles easily because it is wound up in a direction in which the circumferential length is reduced. If such wrinkles are formed, unevenness results in the corresponding portion. Therefore, when the tire is deflected under load, a distortion concentrates on the portion having unevenness. Consequently, separation may occur and durability may be impaired correspondingly.

SUMMARY

In view of such circumstances, it is an object to provide a pneumatic tire having a configuration in which a carcass ply is wound up from the outside to the inside in the widthwise direction in which formation of wrinkles at the time of being wound up is restrained and durability is improved.

A pneumatic tire of an embodiment disclosed here is a pneumatic tire including a pair of left and right beads each having a bead core and a bead filler, and a carcass ply extending between the pair of beads, wherein the carcass ply is wound up from outside to inside in the widthwise direction, and an end portion of the wind-up portion of the carcass ply is provided with notches at a plurality of positions in the circumference direction of the tire (hereinafter referred to simply as "circumferential direction).

DETAILED DESCRIPTION

Figure 1:
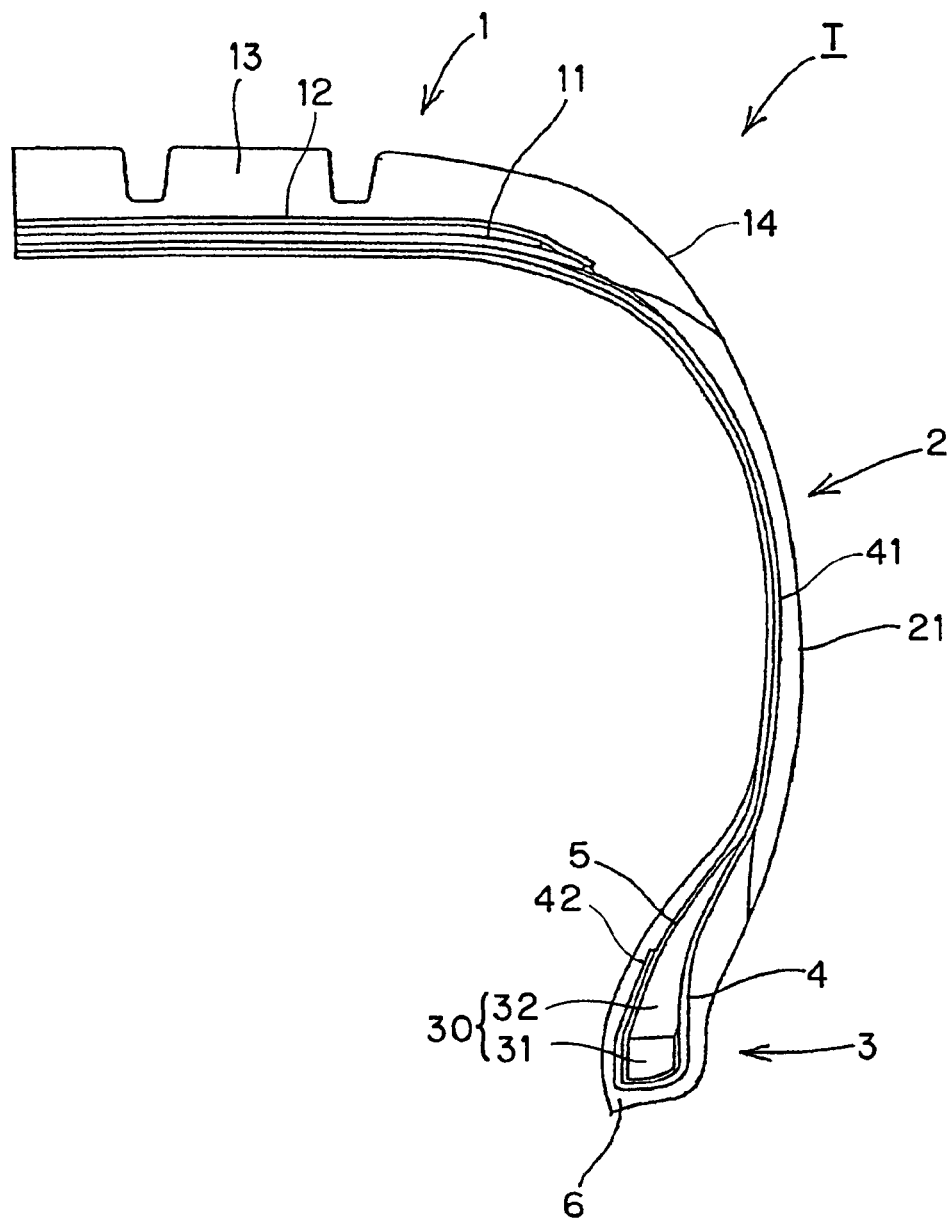
FIG. 1 is a half cross-sectional view of a pneumatic tire of an embodiment.

With a pneumatic tire of the embodiment, since a plurality of notches are provided on an end portion of a wind-up portion of a carcass ply, slack which may cause wrinkles may be absorbed by the notches when winding up the carcass ply from outside to inside in the widthwise direction. Therefore, the wind-up portion may be restrained from getting wrinkled. Consequently, local distortion in the end portion of the wind-up portion is reduced, and occurrence of separation in the wind-up portion is restrained. Referring now to the drawings, preferred embodiments will be described. In this specifications, expressions indicating directions such as a circumferential direction, a radial direction, a widthwise direction are directions with respect to the tire unless otherwise specifically mentioned.

First Embodiment

A pneumatic tire T of an embodiment illustrated in FIG. 1 is a pneumatic radial tire for passenger vehicles, and includes a tread portion 1 which constitutes part of a contact area, a pair of left and right bead portions 3, and a pair of left and right sidewall portions 2 interposed between the tread portion 1 and the bead portions 3.

The bead portions 3 each include a bead 30 embedded therein. The bead 30 includes a ring-shaped bead core 31 and a bead filler 32 joined and integrally formed with an outer peripheral surface of the bead core 31. A pair of the left and right beads 30 are provided on the tire T. The bead core 31 is formed into a ring shape with bundled bead wires. The bead filler 32 is formed of hard rubber extending from the bead core 31 outward in the radial direction, and has a substantially triangular cross section reduced in width as it goes toward a distal end.

The tire T includes a carcass ply 4 embedded so as to extend between a pair of the beads 30. The carcass ply 4 extends from the tread portion 1 through the sidewall portions 2 on both sides to the bead portions 3, and both end portions thereof are wound up around the bead cores 31 and are locked. Therefore, the carcass ply 4 includes a main body portion 41 having a troidal structure extending between a pair of the bead cores 31, and a wind-up portion 42 to be wound up around the bead cores 31 on both sides of the main body portion 41. The carcass ply 4 is formed by arranging carcass cords as a reinforcing material by a predetermined number in parallel and coating the carcass cords with rubber. The carcass cords are disposed so as to extend at a substantially right angle with respect to the circumferential direction. In this example, the carcass ply 4 has a single layer structure having a single ply.

Figure 2:
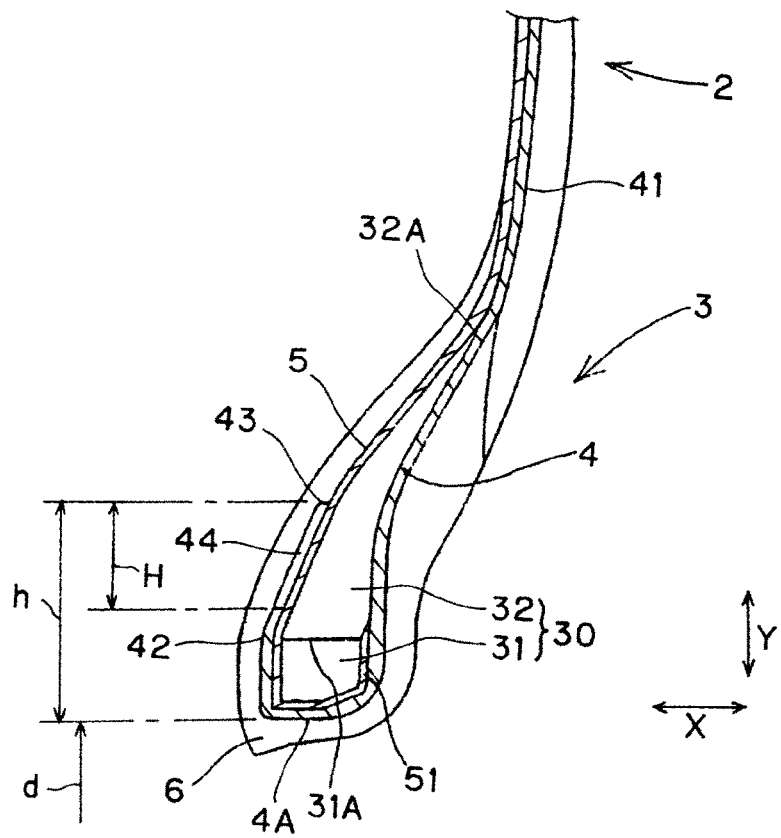
FIG. 2 is an enlarged cross-sectional view illustrating a portion around a bead portion in FIG. 1.

As illustrated in FIG. 2, the both end portions of the carcass ply 4 pass along the bead fillers 32 on the side of an outer surface of the tire and are wound up, that is, are turned up from the outside to the inside in the widthwise direction (in other words, the direction of an axis of tire) X around the bead cores 31 at the bead portions 3. The wind-up portions 42 wound up in this manner extend outward in the radial direction on the inside of the beads 30 each including the bead core 31 and the bead filler 32 in the widthwise direction. In this example, the end portions (outer end portions in the radial direction) 43 of the wind-up portions 42 extend to the bead fillers 32 beyond outer peripheral surfaces 31A of the bead cores 31, and terminate on the inside of outer ends 32A of the bead fillers 32 in the radial direction.

An inner liner 5 is provided on an inner surface of the tire as a gas barrier rubber layer for maintaining an internal pressure. The inner liner 5 is arranged on an inner peripheral side of the carcass ply 4. Both end portions of the inner liner 5 are wound up around the bead cores 31 from the inside to the outside in the widthwise direction X at the bead portions 3. The both end portions of the inner liner 5 extend between the bead cores 31 and the carcass ply 4 around the bead cores 31. In this manner, the inner liner 5 is sandwiched between the beads 30 and the carcass ply 4 at the bead portions 3. The wind-up height of a wind-up portion 51 of the inner liner 5 is not specifically limited. In this example, the wind-up portions 51 terminate in the vicinity of the outer peripheral surfaces 31A of the bead cores 31. However, the wind-up portions 51 may terminate at positions beyond the outer peripheral surfaces 31A, or may terminate on the inside of the outer peripheral surfaces 31A in the radial direction.

A belt 11 is disposed in the tread portion 1 on an outer peripheral side of the carcass ply 4. The belt 11 includes one or more belt layers composed of a belt cord arranged obliquely with respect to the circumferential direction by a certain angle. In this example, the belt 11 includes two belt layers. A tread rubber 13 is provided on the outer peripheral side of the belt 11 through the intermediary of a belt reinforcing layer 12 formed by winding an organic fiber cord into a helical shape. Sidewall rubbers 21 are provided in the sidewall portions 2 along the carcass ply 4 on the outside of the tire.

The bead portions 3 are provided with rubber chafers 6. The rubber chafers 6 are arranged so as to cover the carcass ply 4 and the inner liner 5 around the bead cores 31. Specifically, the rubber chafers 6 are arranged as follows. The rubber chafers 6 cover portions of the bead portions 3 where the bead portions 3 come into contact with rims at the time of assembling the rims. And the rubber chafers 6 cover at least the end portions 43 of wind-up portions 42 of the carcass ply 4. In this example, end portions (outer ends in the radial direction) of the rubber chafers 6 which are disposed on the inner side of the tire extend beyond distal ends of the wind-up portions 42 and terminate on the inner liner 5 so as to cover at least the wind-up portions 42 of the carcass ply 4. Therefore, at the bead portions 3, the carcass ply 4 and the inner liner 5 are not exposed to the surface.

Figure 3:
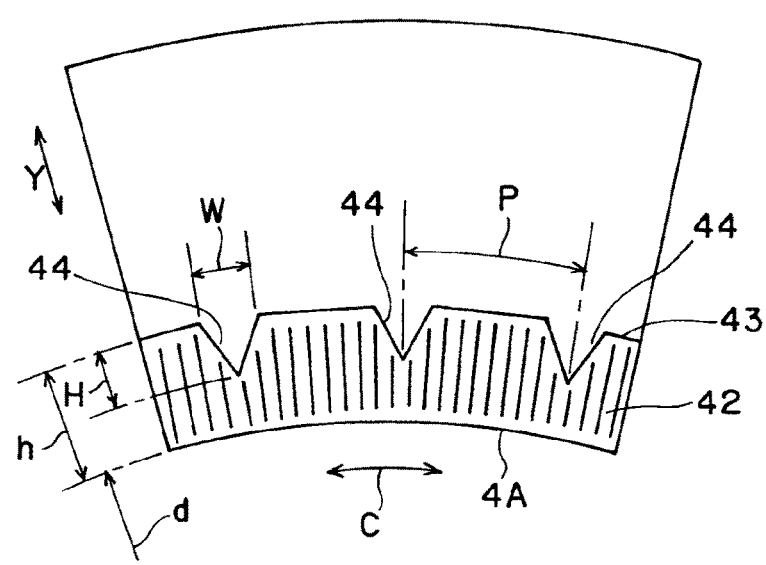
FIG. 3 is a front view illustrating a wind-up portion of the carcass ply.

As illustrated in FIG. 2 and FIG. 3, notches 44 are formed at a plurality of positions in a circumferential direction C at the end portions 43 of the wind-up portions 42 of the carcass ply 4. In other words, the wind-up portions 42 each include the notches 44 having a depressed shape depressed inward in the radial direction from the distal end of the wind-up portion 42 (the end on the outside in the radial direction) at a plurality of positions in the circumferential direction C. The notches 44 of this example are V-shaped incisions, and are each formed into a triangular shape gradually reduced in width as it goes inward in the radial direction from an outer peripheral edge of the wind-up portion 42. A plurality of the notches 44 are provided at a distance with each other (that is, at a predetermined interval in the circumferential direction C), and in this example, are provided equidistantly in the circumferential direction C.

The dimensions and arrangement of the notches 44 are preferably set as follows. As illustrated in FIG. 3, the width of the notch 44 in the circumferential direction C is expressed by W, and the array pitch of the notches 44 in the circumferential direction C is expressed by P. Also, as illustrated in FIG. 2 and FIG. 3, the height of the notch 44 in a radial direction Y is expressed by H, the wind-up height of the carcass ply 4 is expressed by h, and a nominal rim diameter is expressed by d. Here, the width W of the notch 44 is a width of the notch 44 at a position where the length in the circumference direction C is the largest. The array pitch P corresponds to a distance between widthwise centers of the adjacent notches 44 and 44. The wind-up height h corresponds to a wind-up height of the carcass ply 4 with respect to the position of the nominal rim diameter d, and a height from the position of the nominal rim diameter d to the distal end of the wind-up portion 42 in the radial direction Y (in other words, in the direction perpendicular to a tire axis). In this example, the position of the nominal rim diameter d matches a lower end 4A of the carcass ply 4 (a point located at the innermost position in the radial direction Y). At this time, the height H of the notch 44 preferably falls within a range from 0.5 h to 1.0 h, and the width W of the notch 44 preferably falls within a range from 0.3 P to 1.0 P. The array pitch P is preferably set so that the integral multiple of the array pitch P matches the circumferential length at the position of the wind-up end in order to ensure uniformity at joint portions of the carcass ply 4 wound around the circumferences. Therefore, the array pitch P is preferably set to be P=(1/N)×(d+2h)×(N is the number of the notches 44 to be arranged, and is preferably from 3 to 36, more preferably from 9 to 36).

These dimensions are dimensions in an unloaded normal state in which the tire is mounted on a normal rim, and has a normal internal pressure. The normal rim here corresponds to "standard rim" in JATMA standard, "Design Rim" in TRA standard, or "Measuring Rim" in ETRTO standard. The normal inner pressure corresponds to "maximum air pressure" in JATMA standard, "maximum value" described in "TIRE LOAD LIMITS AT VARIOUS COLD INFLATION PRESSURES" in TRA standard, or "INFLATION PRESSURE" in ETRTO standard.

According to the embodiment having the configuration as described thus far, with the structure in which the carcass ply 4 is wound up from the outside to the inside in the widthwise direction X, a distribution of a tensile force to be applied to the carcass ply 4 changes. In particular, a tensile force from shoulder areas 14 of the tread portion 1 to a position of the tire having the largest width (hereinafter, referred to as "the tire maximum width position") is increased, and hence rigidity is enhanced correspondingly. Therefore, the steering stability of the pneumatic tire T may be improved.

In the configuration in which the carcass ply 4 is wound up from the outside to the inside in this manner, since the notches 44 are provided at the end portions 43 of the wind-up portions 42 of the carcass ply 4 along the circumferential direction C, slack which causes wrinkles may be absorbed at the notches 44 when winding up the carcass ply 4. Consequently, since the wrinkles at the wind-up portion 42 may be eliminated, the distortion occurring in the end portions 43 of the wind-up portions 42 is uniformized, so that occurrence of the separation at the wind-up portions may be restrained and hence the durability may be improved. Since the height H, the width W, and the array pitch P of the notch 44 are set as descried above, an effect of restraining generation of the wrinkles is enhanced.

According to the embodiment, since the both end portions of the inner liner 5 are arranged between the bead cores 31 and the carcass ply 4, the bead cores 31 and the carcass ply 4 do not come into direct contact with each other. Therefore, breakage caused by the direct contact between the bead cores 31 and the carcass ply 4 and graze in a high tension state may be prevented. In addition, since a specific shock-absorbing member needs not to be provided additionally for preventing the direct contact as descried above, the above-described breakage prevention is achieved without increasing the weight.

Second Embodiment

Figure 4:
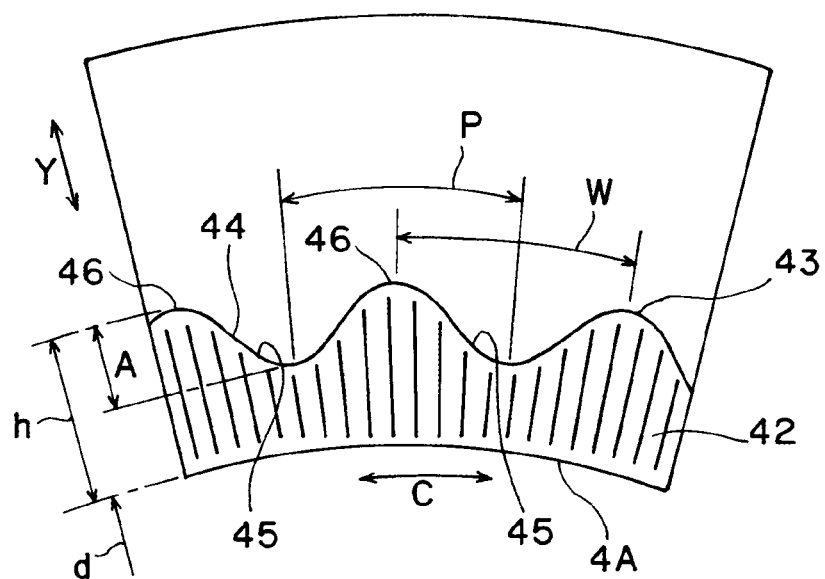
FIG. 4 is a front view illustrating a modification of the wind-up portion of the carcass ply.

FIG. 4 is a front view illustrating a wind-up portion of the carcass ply of a second embodiment.

In the second embodiment, the end portions 43 of the wind-up portions 42 of the carcass ply 4 have a repeated shape having an amplitude A in the radial direction Y with depressions 45 formed by the notches 44 and projections 46 between the notches 44. More specifically, in this example, the end portions 43 of the wind-up portions 42 are formed into a wavy shape in the tire circumference direction C. Therefore, the notches 44 that form the depressions 45 are formed by cutting the both end portions of the carcass ply 4 into a curved shape, whereby the projections 46 formed between the adjacent notches 44 are also formed into a curved shape. The amplitude A of the wavy shape corresponds to the height H of the notch 44. In this case, the width W of the notches 44 correspond to the array pitch P.

Figure 5:
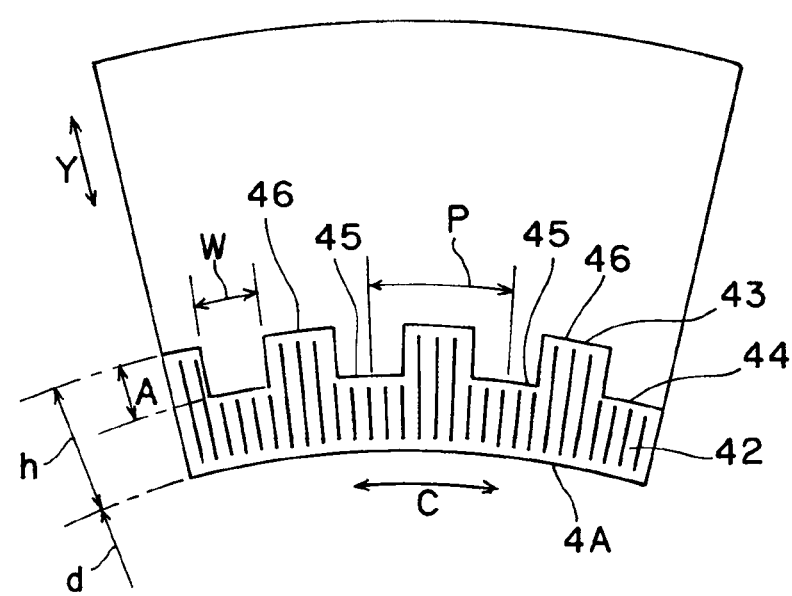
FIG. 5 is a front view illustrating another modification of the wind-up portion of the carcass ply.

FIG. 5 is illustrates a modification of the wind-up portion of the carcass ply of a second embodiment. In this example, instead of forming the repeated shape having the amplitude A into a wavy shape, the repeated shape has a square depressions and projections. Specifically, the depressions 45 are formed by the square shaped notches 44, and square shaped projections 46 are formed between the adjacent notches 44. The width W of the depressions 45 (that is, the notches 44) is equal to the width of the projections 46, and hence the width W is set to be ½ the array pitch P of the notches 44. The amplitude A corresponds to the height H of the notch 44.

According to the second embodiment, the end portions 43 of the wind-up portions 42 of the carcass ply 4 are formed into the repeated shape having the amplitude A in the radial direction Y Therefore, in addition to the effect of restraining formation of wrinkles as described above, the distortion occurring in the end portions 43 of the wind-up portions 42 may be dispersed in the radial direction Y. Consequently, from this point of view, occurrence of separation at the wind-up portions 42 may be restrained. In terms of the effect of restraining the occurrence of wrinkles, the notches 44 are preferably formed into a V-shape as described in the first embodiment. Therefore, for example, the end portions of the wind-up portions may be formed into a zigzag shape in the circumference direction so as to achieve a repeated shape having the amplitude A with the V-shaped notches. Other configurations and the effects of the second embodiment are the same as those of the first embodiment, and description will be omitted.

Third Embodiment

Figure 6:
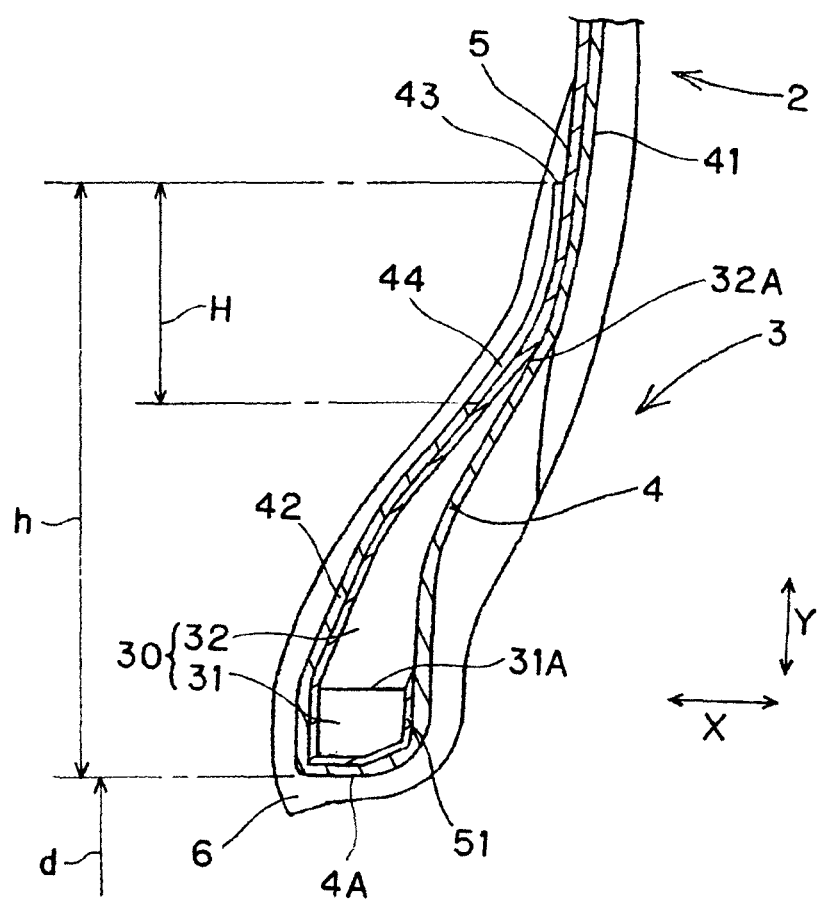
FIG. 6 is a cross-sectional view of a principal portion illustrating a portion around a bead portion of a pneumatic tire of another embodiment.

FIG. 6 is a drawing illustrating a structure around the bead portion according to a third embodiment. In this example, the wind-up portions 42 of the carcass ply 4 extends outward in the radial direction beyond outer ends 32A of the bead fillers 32 in the radial direction and terminates in the sidewall portions 2. The wind-up portions 42 may terminate inside the tire maximum width position, or may terminate at a position beyond the tire maximum width position.

In this manner, the end portions 43 of the wind-up portions 42 of the carcass ply 4 may be located on the outside of the outer ends 32A of the bead fillers 32 in the radial direction. In this manner, with the provision of the notches 44 on the end portions 43 of the wind-up portions 42, slack which may cause formation of wrinkles may be absorbed by the notches 44 even though the wind-up height is high when the carcass ply 4 is wound up, so that creation of wrinkles on the wind-up portions 42 is restrained.

The embodiments of the present invention are described. However, the embodiments are proposed as examples, and are not intended to limit the scope of the invention. Other various embodiments can be put into practice, and it is possible to make various omissions, replacements, and modifications to the embodiments without departing from the spirit of the invention. Similarly to the fact that the embodiments and the modifications are included in the scope and the spirit of the invention, the embodiments and the modifications are included in the invention described in the patent claims and equivalent scopes.

What is claimed is:

1. A pneumatic tire comprising:
   a pair of left and right beads each including a bead core and a bead filler;
   a carcass ply extending between the pair of beads, and an inner liner arranged on an inner peripheral side of the carcass ply, wherein
   the carcass ply is wound up around the bead core from outside to inside in the widthwise direction of the tire, and an end portion of the wind-up portion of the carcass ply is provided with notches at a plurality of positions in a circumference direction of the tire,
   the inner liner is wound up around the bead core from the inside to the outside in the widthwise direction of the tire, and both end portions of the inner liner extend in between the bead cores and the carcass ply, and
   the inner liner is a gas barrier rubber layer which does not comprise cords which does not comprise carcass cords.

2. The pneumatic tire according to claim 1, wherein the notch have a V-shape.

3. The pneumatic tire according to claim 1, wherein the notch are provided so as to satisfy relationships of H=0.5 h to 1.0 h and W=0.3 P to 1.0 P, where H is a height of the notch in the radial direction of the tire, W is a width in the circumference direction of the tire, P is an array pitch of the notches in the tire circumference direction, and h is a wind-up height of the carcass ply with reference to the position of a nominal rim diameter.

4. The pneumatic tire according to claim 1, wherein the end portion of the wind-up portion of the carcass ply has a repeated shape having an amplitude in the radial direction of the tire, and the repeated shape includes depressions formed by the notches and projections between the notches.

5. The pneumatic tire according to claim 1, further comprising a rubber chafer around the bead core, where the rubber chafer is arranged so as to cover at least the end portion of the wind-up portion of the carcass ply.

\* \* \* \* \*